United States Patent
Li et al.

(10) Patent No.: US 9,736,333 B1
(45) Date of Patent: Aug. 15, 2017

(54) FILTER CONFIGURATION FOR SOFTWARE BASED IMAGE PATH

(71) Applicant: Xerox Corporation, Norwalk, CT (US)

(72) Inventors: Xing Li, Webster, NY (US);
Dhevendra Alagan Palanivel, Chennai (IN); Sainarayanan Gopalakrishnan, Chennai (IN); Vignesh Doss, Tamil Nadu (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/094,681

(22) Filed: Apr. 8, 2016

(51) Int. Cl.
*H04N 1/40* (2006.01)
*H04N 1/409* (2006.01)
*H04N 1/393* (2006.01)
*G06K 15/02* (2006.01)
*G06T 15/02* (2011.01)
*G06T 3/40* (2006.01)
*G06T 5/00* (2006.01)

(52) U.S. Cl.
CPC ......... *H04N 1/409* (2013.01); *G06K 15/1843* (2013.01); *G06K 15/1847* (2013.01); *G06K 15/1872* (2013.01); *G06T 3/40* (2013.01); *G06T 3/403* (2013.01); *G06T 5/003* (2013.01); *H04N 1/393* (2013.01); *H04N 1/4092* (2013.01); *H04N 1/40093* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,111,285 | A * | 5/1992 | Fujita | H04N 1/409 358/447 |
| 6,980,696 | B2 * | 12/2005 | Maurer | G06T 5/004 382/262 |
| 8,601,042 | B2 * | 12/2013 | Yamajo | G06T 5/002 708/300 |
| 2009/0245679 | A1 * | 10/2009 | Ohwaki | G06T 5/20 382/260 |
| 2011/0292257 | A1 * | 12/2011 | Hatakeyama | H04N 1/58 348/242 |

* cited by examiner

*Primary Examiner* — Scott A Rogers

(57) ABSTRACT

A method, non-transitory computer readable medium and apparatus for generating an output image are disclosed. For example, the method includes receiving an image, applying a first filter, applying a second filter, calculating a difference between the image with the second filter that was applied and the image with the first filter that was applied and transmitting the difference to a sharpening module and a segmentation module to generate the output image.

18 Claims, 4 Drawing Sheets

FILTER CONFIGURATION FOR SOFTWARE BASED IMAGE PATH

The present disclosure relates generally to software based image paths for printers and multi-function devices (MFDs) and, more particularly, to an improved filter configuration for software based image paths.

BACKGROUND

In the software based image path developed for scan and copy services, there are several modules that are used to process a received image for printing or scanning. One of the modules is a two dimension (2D) filter. The 2D filter is typically a 7×7 filter that performs convolution. In a typical software based image path, two 7×7 filters may be deployed for a separate sharpness adjustment path and a separate image segmentation path. However, the 7×7 filters may be computationally intensive and may be a bottleneck within the software based image path with respect to processing speed, memory usage, and the like.

SUMMARY

According to aspects illustrated herein, there are provided a method, non-transitory computer readable medium and apparatus for generating an output image. One disclosed feature of the embodiments is a method that receives an image, applies a first filter, applies a second filter, calculates a difference between the image with the second filter that was applied and the image with the first filter that was applied and transmits the difference to a sharpening module and a segmentation module to generate the output image.

Another disclosed feature of the embodiments is a non-transitory computer-readable medium having stored thereon a plurality of instructions, the plurality of instructions including instructions which, when executed by a processor, cause the processor to perform operations that receive an image, apply a first filter, apply a second filter, calculate a difference between the image with the second filter that was applied and the image with the first filter that was applied and transmit the difference to a sharpening module and a segmentation module to generate the output image.

Another disclosed feature of the embodiments is an apparatus comprising a processor and a computer-readable medium storing a plurality of instructions which, when executed by the processor, cause the processor to perform operations that receive an image, apply a first filter, apply a second filter, calculate a difference between the image with the second filter that was applied and the image with the first filter that was applied and transmit the difference to a sharpening module and a segmentation module to generate the output image.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for filtering an image via an improved filter configuration for a software based image path. As discussed above, in the software based image path developed for scan and copy services, there are several modules that are used to process a received image for printing. One of the modules is a two dimension (2D) filter. The 2D filter is typically a 7×7 filter that performs convolution. In a typical software based image path, two 7×7 filters may be deployed for a separate sharpness adjustment path and a separate image segmentation path. However, the 7×7 filters may be computationally intensive and may be a bottleneck within the software based image path with respect to processing speed, memory usage, and the like.

Embodiments of the present disclosure provide a novel method and apparatus uses an improved filter configuration for the software based image path that is more efficient. For example, instead of using two separate 7×7 filters, a single filter module that includes a 3×3 filter and a 5×5 filter may be deployed. The combination of the 3×3 filter and the 5×5 filter may perform convolution on an image and provide the filtered image to both a sharpening module and a segmentation module. In other words, a single filter module that is computationally equivalent to a single 7×7 filter may be used for both the sharpening image path and the segmentation image path rather than using two separate and computationally intensive 7×7 filters.

Figure 1:
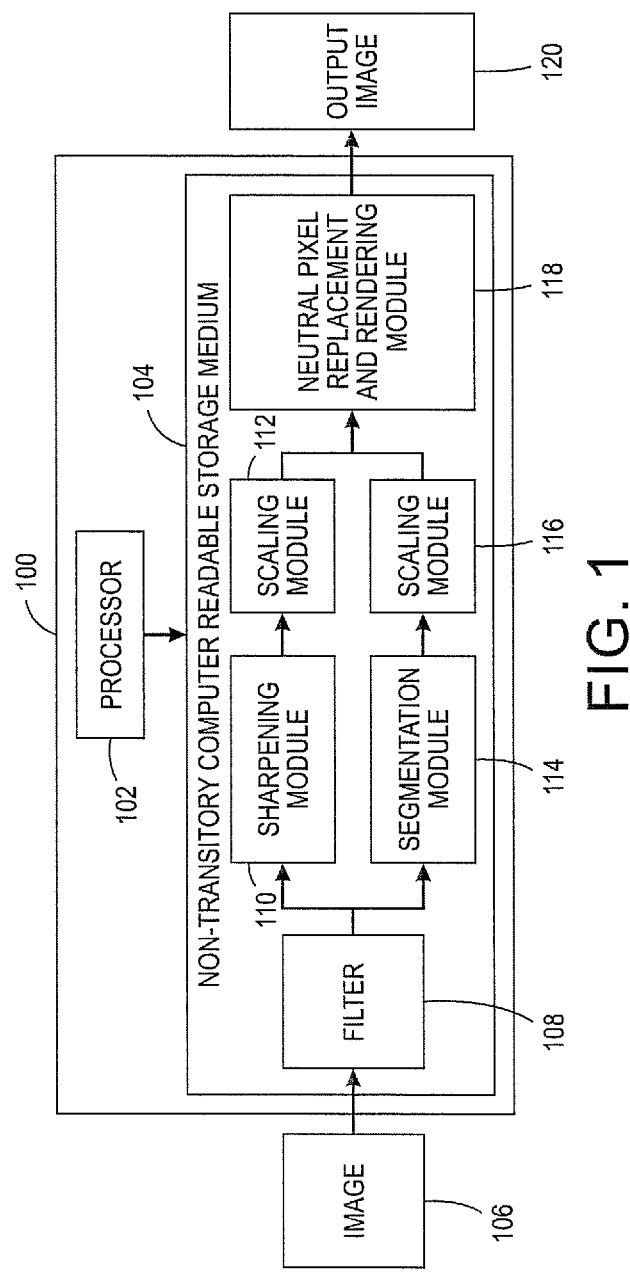
FIG. 1 illustrates an example apparatus of the present disclosure.

FIG. 1 illustrates an example apparatus 100 of the present disclosure. In one embodiment, the apparatus 100 may be a multi-function device (MFD) that has print/scan/fax/copy capabilities, an ink jet printer, a laser printer, and the like. In one embodiment, the apparatus 100 may include a processor 102 and a non-transitory computer readable storage medium 104 that stores instructions. The instructions may be executed by the processor 102 and one or more hardware devices of the apparatus 100 (e.g., paper handlers, nips, transports, imaging devices, and the like, not shown) to perform the functions described herein.

In one embodiment, the non-transitory computer readable storage medium 104 may include a filter 108, a sharpening module 110, a segmentation module 114, scaling modules 112 and 116, and a neutral pixel replacement and rendering module 118. It should be noted that the software image path illustrated by example in the non-transitory computer readable storage medium 104 includes a single filter 108. In contrast, currently deployed software based image paths uses two separate 7×7 filters. For example, a first 7×7 filter is used for the sharpening module 110 and a second 7×7 filter is used for the segmentation module 114.

It should be noted that the software image path illustrated in the non-transitory computer readable storage medium 104 has been simplified for ease of explanation. For example, the software image path may include other modules and functions that are not shown in FIG. 1.

In one embodiment, the apparatus 100 may receive an image 106 for processing. The image 106 may be received via a scanning operation on the apparatus 100 when the apparatus is an MFD. In another example, the image 106 may be received from another endpoint device (not shown) via a wired or wireless connection over an Internet protocol (IP) communication network (not shown). For example, the image 106 may be a print job request.

The image 106 may be processed by the filter 108. In one embodiment, the filter 108 may perform a convolution process on the image 106. The information from the processed image 106 may then be transmitted to both the sharpening module 110 and the segmentation module 114 via different paths to generate an output image 120.

Figure 2:
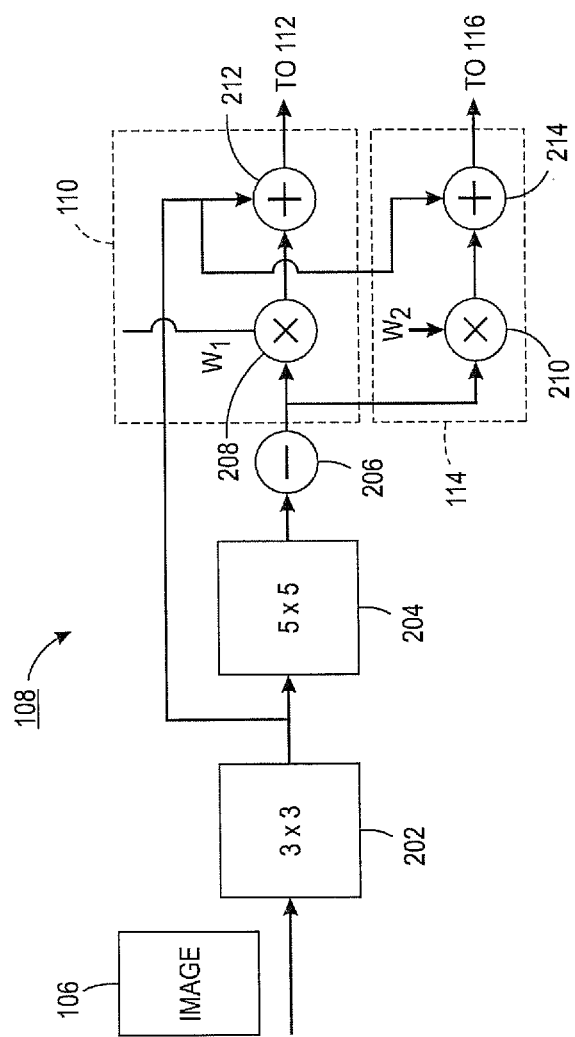
FIG. 2 illustrates an example detailed block diagram of a filter of the present disclosure.

In one embodiment, the sharpening module 110 and the segmentation module 114 may be part of a combination process. The sharpening module 110 and the segmentation module 114 may be configured to appear as an un-sharp masking operation. The details of the filter 108, the sharpening module 110 and the segmentation module 114 are illustrated in FIG. 2 and discussed below.

In one embodiment, sharpening module 110 may process the image 106 to sharpen or soften the edges or halftones of the image 106. In one embodiment, the sharpening module 110 may sharpen or soften the image 106 in accordance with a desired sharpness level. The sharpening module 110 may be used. For example, a user may select a desired sharpness level (or softness level) via a user interface of the apparatus 100. The image 106 may be adjusted to the desired sharpness level and fed to a respective scaling module 112. The scaling module 112 may scale the image 106 to a desired size (e.g., 100% of the original image, 75% of the original image, 200% of the original image, and the like) that is selected by the user. The processed image 106 may then be transmitted to the neutral pixel replacement and rendering module 118.

In one embodiment, the segmentation module 114 may process the image 106 to segment the image 106. For example, any type of segmentation algorithm may be deployed by the segmentation module 114 that is appropriate for a particular image processing application. Different examples of the segmentation algorithms may include thresholding, clustering, edge detection, region growing, and the like. The segmented image 106 may then be fed to a respective scaling module 116. The scaling module 116 may scale the image 106 to the desired size of the image 106. In one embodiment, the size that the image 106 is scaled to by the scaling module 116 may be the same as the size that the image 106 is scaled to by the scaling module 112. The processed image 106 may then be transmitted to the neutral pixel replacement and rendering module 118.

In one embodiment, the sharpened image 106 and the segmented image 106 may be combined and processed by the neutral pixel replacement and rendering module 118 to generate the output image 120. For example, a rasterization may be applied to the combined image 106 to generate the output image 120. The output image 120 may then be printed by the apparatus 100 or transmitted to an endpoint device via the IP communications network for storage and/or further processing.

FIG. 2 illustrates an example detailed block diagram of the filter 108. In one embodiment, the filter 108 may include a first filter 202 and a second filter 204. In one embodiment, the first filter 202 may be a 3 by 3 (e.g., 3×3) filter and the second filter may be a 5 by 5 (e.g., 5×5) filter. The first filter 202 and the second filter 204 may be computationally equivalent to a single 7×7 filter, as noted above. However, the present disclosure uses a single equivalent 7×7 filter represented by the first filter 202 and the second filter 204 instead of two separate 7×7 filters used by current software image paths.

In one embodiment, the first filter 202 and the second filter 204 may have a symmetric weighting applied to each pixel. In another embodiment, the first filter 202 and the second filter 204 may have different weightings for each pixel. For example, outer edge pixels of the first filter 202 and the second filter 204 may be weighted less than pixels in the center, or vice versa.

In one embodiment, the image 106 may be fed through the first filter 202 and the second filter 204. A subtraction operator 206 may calculate a difference between the image 106 filtered by the second filter 204 and the image 106 filtered by the first filter 202. The difference may be fed to two different paths that include the sharpening module 110 and the segmentation module 114.

In one embodiment, the sharpening module 110 may include a multiplication operator 208 that multiplies the difference calculated by the subtraction operator 206 by a first weight. In one embodiment, the first weight may be determined based upon a user selected level of sharpness. For example, different weight values may be pre-determined for the different levels of sharpness that can be selected. For example, each level of sharpness (or softness for low sharpness levels) can be associated with a particular weight value. Based on the level of sharpness of selected, the corresponding weight value may be selected as the first weight and applied to the difference.

The sharpening module 110 may also include an addition operator 212 to add back the difference that was calculated by the subtraction operator 206. The sharpened image may then be output and transmitted to the scaling module 112.

In one embodiment, the segmentation module 114 may include a multiplication operator 210 that multiplies the difference calculated by the subtraction operator 206 by a second weight. In one embodiment, the second weight may be determined based on a type of segmentation algorithm that is applied. For example, the second weight may be determined empirically based on the type of segmentation algorithm that is applied.

In one embodiment, the first weight and the second weight may be any value. In one embodiment, the first weight and the second weight may be any value between 0 and approximately 10. For example, the first weight and the second weight may be values such as 0.8, 1.5, 3, 4.7, and the like.

The segmentation module 114 may also include an addition operator 214 to add back the difference that was calculated by the subtraction operator 206. The segmented image may then be output and transmitted to the scaling module 116. The sharpened image and the segmented image may then be combined by the neutral pixel replacement and rendering module 118, as described above with respect to FIG. 1.

Figure 3:
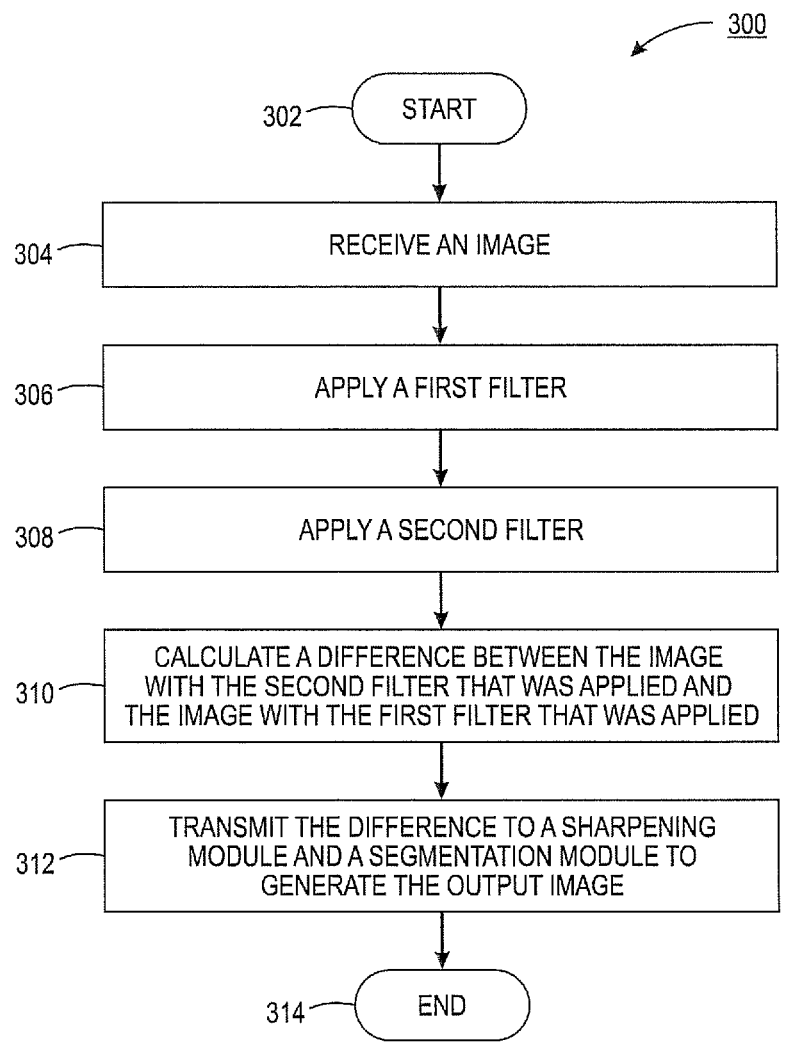
FIG. 3 illustrates a flowchart of an example method for generating an output image.
Figure 4:
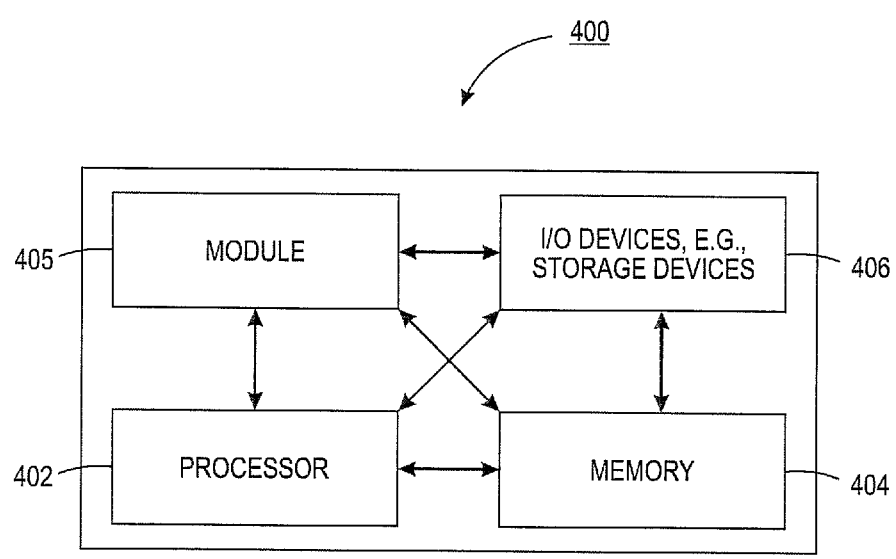
FIG. 4 illustrates a high-level block diagram of a computer suitable for use in performing the functions described herein.

FIG. 3 illustrates a flowchart of an example method 300 for generating an output image. In one embodiment, one or more steps or operations of the method 300 may be performed by the apparatus 100 or a computer as illustrated in FIG. 4 and discussed below.

At block 302, the method 300 begins. At block 304, the method 300 receives an image. For example, the image may be received via a scanning operation on the apparatus when the apparatus is an MFD. In another example, the image may be received from another endpoint device (not shown) via a wired or wireless connection over an Internet protocol (IP) communication network (not shown). For example, the image may be a print job request.

At block 306, the method 300 applies a first filter. In one embodiment, the first filter may be a 3×3 filter. The 3×3 filter may have a symmetric weighting for each pixel of the filter or may have different weightings for each pixel of the filter depending on a type of filtering process that is applied. Different examples of the segmentation algorithms may include thresholding, clustering, edge detection, region growing, and the like.

At block 308, the method 300 applies a second filter. In one embodiment, the second filter may be a 5×5 filter. The 5×5 filer may have a symmetric weighting for each pixel of the filter or may have different weightings for each pixel of the filter depending on a type of filtering process that is applied.

At block 310, the method 300 calculates a difference between the image with the second filter that was applied and the image with the first filter that was applied. For example, a subtraction operator may calculate the difference between the image with the second filter that was applied and the image with the first filter that was applied.

At block 312, the method 300 transmits the difference to a sharpening module and a segmentation module to generate the output image. For example, the first filter and the second filter may have an equivalent amount of computation as a single 7×7 filter. The first filter and the second filter may be used to provide the difference of the filtered images to both the sharpening module and the segmentation module, as opposed to using two separate 7×7 filters as deployed in current software image paths. In other words, the present disclosure provides a filter configuration that reduces the computational complexity by half of currently deployed filter configurations.

In one embodiment, the sharpening module may multiply the difference that is calculated by a first weight and the segmentation module may multiply the difference that is calculated by a second weight. The first weight and the second weight may be different values. For example, the first weight may be determined based upon a user selected level of sharpness. The second weight may be determined based on a type of segmentation algorithm that is applied. For example, the second weight may be determined empirically based on the type of segmentation algorithm that is applied.

After the differences are multiplied by the respective weights in the sharpening module and the segmentation module, the differences that were calculated may be added back into the weighted images. The weighted images may then be combined to generate the output image.

In one embodiment, each of the weighted images may be scaled to a desired size. The scaled images may then be combined and fed to a neutral pixel replacement and rendering module to generate the output image. The output image may be printed or transmitted to an endpoint device via the IP communications network for storage and/or further processing. At block 314, the method 300 ends.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application.

FIG. 4 depicts a high-level block diagram of a computer that can be transformed into a machine that is dedicated to perform the functions described herein. As a result, the embodiments of the present disclosure improve the operation and functioning of a multi-function device to generate an output image using an improved filter configuration for software based image paths, as disclosed herein.

As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for generating an output image, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for generating an output image (e.g., a software program comprising computer-executable instructions) can be loaded into memory 404 and executed by hardware processor element 402 to implement the steps, functions or operations as discussed above in connection with the exemplary method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for generating an output image (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for generating an output image, comprising:
   receiving, by a processor, an image;
   applying, by the processor, a first filter to the image;
   applying, by the processor, a second filter to the image;
   calculating, by the processor, a difference between a first value of each pixel obtained by a convolution process performed on the image with the second filter that was applied and a second value of each pixel obtained by the convolution process performed on the image with the first filter that was applied; and
   transmitting, by the processor, the difference to a sharpening module and a segmentation module, wherein the sharpening module and the segmentation module process the image using the difference to generate the output image, wherein the sharpening module processes the image by applying a first weight to the difference and adding the difference back to the image.

2. The method of claim 1, wherein the first filter comprises a 3 by 3 filter.

3. The method of claim 1, wherein the second filter comprises a 5 by 5 filter.

4. The method of claim 1, wherein the first weight is determined based upon a user selected level of sharpness.

5. The method of claim 1, wherein the segmentation module processes the image by applying a second weight to the difference and adding the difference back to the image.

6. The method of claim 5, wherein the second weight is determined based on a type of segmentation algorithm that is applied.

7. The method of claim 1, further comprising:
   scaling, by the processor, the image that is processed by the sharpening module; and
   scaling, by the processor, the image that is processed by the segmentation module.

8. The method of claim 7, further comprising:
   combining, by the processor, the image processed by the sharpening module and the segmentation module;
   replacing, by the processor, neutral pixels of the image;
   rendering, by the processor, the image; and
   printing, by the processor, the output image.

9. A non-transitory computer-readable medium storing a plurality of instructions, which when executed by a processor, cause the processor to perform operations for generating an output image, the operations comprising:
   receiving an image;
   applying a first filter to the image;
   applying a second filter to the image;
   calculating a difference between a first value of each pixel obtained by a convolution process performed on the image with the second filter that was applied and a second value of each pixel obtained by the convolution process performed on the image with the first filter that was applied; and
   transmitting the difference to a sharpening module and a segmentation module, wherein the sharpening module and the segmentation module process the image using the difference to generate the output image, wherein the sharpening module processes the image by applying a first weight to the difference and adding the difference back to the image.

10. The non-transitory computer-readable medium of claim 9, wherein the first filter comprises a 3 by 3 filter.

11. The non-transitory computer-readable medium of claim 9, wherein the second filter comprises a 5 by 5 filter.

12. The non-transitory computer-readable medium of claim 9, wherein the first weight is determined based upon a user selected level of sharpness.

13. The non-transitory computer-readable medium of claim 9, wherein the segmentation module processes the image by applying a second weight to the difference and adding the difference back to the image.

14. The non-transitory computer-readable medium of claim 13, wherein the second weight is determined based on a type of segmentation algorithm that is applied.

15. The non-transitory computer-readable medium of claim 9, further comprising:
   scaling the image that is processed by the sharpening module; and
   scaling the image that is processed by the segmentation module.

16. The non-transitory computer-readable medium of claim 15, further comprising:
   combining the image processed by the sharpening module and the segmentation module;
   replacing neutral pixels of the image;
   rendering the image; and
   printing the output image.

17. A method for generating an output image, comprising:
   receiving, by a processor, an image;
   applying, by the processor, a 3 by 3 filter to the image;
   applying, by the processor, a 5 by 5 filter to the image;
   calculating, by the processor, a difference between a first value of each pixel obtained by a convolution process performed on the image with the 5 by 5 filter that was applied and a second value of each pixel obtained by the convolution process performed on the image with the 3 by 3 filter that was applied;
   multiplying, by the processor, the difference with a first weight to sharpen the image to a desired level;
   adding, by the processor, the difference to the image that is sharpened;
   multiplying, by the processor, the difference with a second weight to perform a segmentation on the image;
   adding, by the processor, the difference to the image that is segmented;
   combining, by the processor, the image that is sharpened and segmented; and
   generating, by the processor, the output image based on the image that is sharpened and segmented.

18. The method of claim 17, further comprising:
   scaling, by the processor, the image that is sharpened; and
   scaling, by the processor, the image that is segmented.

* * * * *